United States Patent [19]

Jacob

[11] Patent Number: 5,448,012
[45] Date of Patent: Sep. 5, 1995

[54] METHOD FOR INSTALLING ELECTRICAL CONDUIT AND SYSTEM THEREFOR

[76] Inventor: Gary R. Jacob, R.R. 1, Box 116, Glasford, Ill. 61533

[21] Appl. No.: 81,589

[22] Filed: Jun. 23, 1993

[51] Int. Cl.⁶ .............................................. H02G 3/08
[52] U.S. Cl. ...................................... 174/48; 174/53; 220/3.3
[58] Field of Search .......................... 174/48, 49, 53; 220/3.2–3.94

[56] References Cited

U.S. PATENT DOCUMENTS

| | | |
|---|---|---|
| D. 277,846 | 3/1985 | McLaughlin . |
| 689,414 | 12/1901 | Robinson . |
| 1,861,435 | 6/1932 | Chamberlain et al. . |
| 2,730,261 | 1/1956 | Tutt . |
| 3,110,754 | 11/1963 | Witort et al. ............... 220/3.7 X |
| 3,701,448 | 10/1972 | Vadnais . |

Primary Examiner—Leo P. Picard
Assistant Examiner—David Tone
Attorney, Agent, or Firm—Rogers, Howell & Haferkamp

[57] ABSTRACT

A method for installing electrical conduit in straight sections between a pair of non-adjacent electrical junction boxes where an interfering box is to be installed between the pair of boxes being connected and at the same elevation is provided. The method utilizes electrical junction boxes that are specifically shaped and designed to permit the use of the straight sections of conduit. The electrical junction boxes include at least one section of a greater depth than the remainder of the electrical junction box and the normally interfering electrical junction box is installed in an inverse orientation with respect to the electrical junction boxes being connected whereby the conduit connecting the pair of non-adjacent boxes passes behind the area of lesser depth and in juxtaposition thereto. A second embodiment utilizing two complementary electrical junction box designs, one design presenting a central notch forming an area of lesser depth and the second design including a central extended section forming an area of greater depth is also disclosed.

19 Claims, 2 Drawing Sheets

METHOD FOR INSTALLING ELECTRICAL CONDUIT AND SYSTEM THEREFOR

BACKGROUND OF THE INVENTION (1) Field of the Invention

This invention relates generally to the installation of electrical systems, and more particularly to a method and system for installing electrical conduit between non-adjacent electrical junction boxes.

(2) Description of Related Art

The installation of an electrical system in a building often requires that the electrical wiring be encased in rigid conduit to protect the wiring being installed or to separate particular types of electrical service. This is particularly true for non-residential construction.

In a typical installation, numerous electrical junction boxes and conduits are installed in the stud spaces in the walls of the building. Standard electrical junction boxes used in commercial construction are of a uniform depth, but are available in a variety of sizes. Because it is often necessary or desirable to connect the conduit, and the wiring therein, between two electrical junction boxes, the space between the walls and the studs can become quite congested with conduit. This problem is magnified when the electrical junction boxes to be connected are not adjacent to each other and another electrical junction box is positioned therebetween and at the same elevation. This situation prohibits the use of straight sections of conduit to connect the pair of electrical junction boxes because the intervening electrical junction box is normally of the same depth as the other electrical junction boxes and creates an obstacle to a straight run of conduit. To remedy this situation, the conduit must be routed around the interfering box. This requires the use of curved conduit containing 90° bends to avoid the interfering electrical junction box. In a typical installation, the electrical conduit is routed out of the top of one box by using conduit having a 90° bend at one end, a straight section of sufficient length to span the distance between the two electrical junction boxes, and another curved section at the opposite end having a 90° bend which is routed into the top of the other electrical junction box. The curved sections of conduit must either be purchased and coupled to straight sections of conduit or the curved sections are fabricated at the site of installation.

Although this method solves the problem of installing conduit between a pair of non-adjacent electrical junction boxes when the location of another electrical junction box prohibits the use of straight sections of conduit, it is not an efficient solution to the problem because it is costly in terms of time and materials. A need exists, therefore, in the building industry for a method of installing electrical conduit between non-adjacent electrical junction boxes that avoids the foregoing problems.

SUMMARY OF THE INVENTION

The present invention is directed to a novel method for installing electrical conduit between at least one pair of non-adjacent electrical junction boxes to avoid interference with an electrical junction box positioned therebetween and a system for performing such an installation. The method and system utilize electrical junction boxes that are shaped in a manner permitting electrical conduit to be installed between two non-adjacent electrical junction boxes in straight sections even when another electrical junction box must necessarily be positioned between and at the same elevation as the electrical junction boxes being connected. The method and system of this invention permit the conduit to pass behind and in juxtaposition to the interfering electrical junction box while maintaining the complete functionality of the intervening electrical junction box.

In one embodiment, all of the electrical junction boxes used in connection with a method of this invention are shaped in an identical manner and include at least two sections of different depths, one section having a greater depth than the other section. The electrical junction boxes include all other standard and necessary features of a typical electrical junction box. The electrical junction boxes are installed in the stud spaces in the normal manner, but when a pair of non-adjacent electrical junction boxes are to be connected by electrical conduit and another electrical junction box is to be positioned between the pair of boxes and at the same elevation, the pair of electrical junction boxes are positioned in an orientation aligning the sections of the electrical junction boxes of greater depth and the electrical junction box positioned between the pair of boxes is positioned in an inverse orientation with respect to the orientation of the pair of electrical junction boxes. This inverse or alternating configuration permits electrical conduit to be installed in straight sections between the sections of greater depths of the pair of boxes by passing behind and in juxtaposition to the section of lesser depth of the intervening box.

In another significant embodiment of the present invention, a method for installing electrical conduit between a pair of non-adjacent electrical junction boxes to avoid interference with an electrical junction box positioned therebetween is provided which utilizes complementarily shaped electrical junction boxes to facilitate the installation of electrical conduit in straight sections. In this embodiment, the pair of electrical junction boxes to be connected have top and bottom sections of a first depth and a central section of a second depth, the second depth being less than the first depth, and the complementary electrical junction boxes have top and bottom sections of a third depth and a central section of a fourth depth, the fourth depth being greater than the third depth. This provides a pair of complementarily shaped electrical junction boxes; one with a central groove and the other with a central extended section. When the installation requires electrical conduit to be connected between a pair of non-adjacent electrical junction boxes, one pair of either of the complementarily shaped electrical junction boxes is selected and installed and at least one of the non-selected electrical junction boxes is installed between the pair of selected electrical junction boxes. Electrical conduit is installed between the pair of non-adjacent electrical junction boxes such that the conduit is installed in straight sections and passes behind and in juxtaposition to the section of lesser depth of the electrical junction box between the pair of non-adjacent electrical junction boxes.

Among the many advantages of the present invention may be noted the provision of methods for installing electrical conduit in applications where flexible wiring is prohibited that permits the installation of conduit in straight sections between non-adjacent electrical junction boxes in situations where a normally interfering electrical Junction box would require the use of curved sections of conduit to avoid the interfering box; methods which allow for more flexibility of design and layout of electrical systems; methods which reduce the congestion of conduit in stud spaces; methods that permit a more efficient and less costly installation of electrical conduit to avoid interfering electrical junction boxes than presently practiced methods; and a system for installing electrical conduit that utilizes electrical junction boxes designed to permit the installation of straight sections of electrical conduit between two non-adjacent electrical junction boxes where a normally interfering box is installed therebetween.

DETAILED DESCRIPTION OF THE EMBODIMENTS

Figure 1:
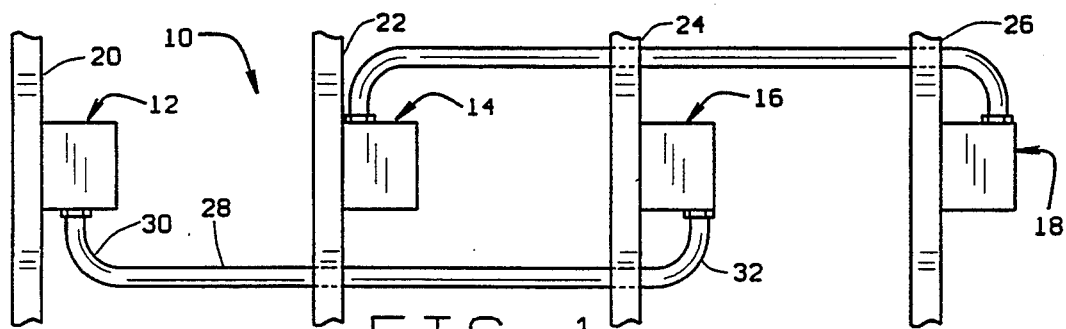
FIG. 1 illustrates a prior art method of installing rigid electrical conduit between a pair of non-adjacent electrical junction boxes where an electrical junction box is positioned therebetween and at the same elevation.

In accordance with the present invention, novel methods are provided which permit a more efficient installation of electrical wiring systems in construction applications requiring the use of electrical conduit. Referring initially FIG. 1, a prior art method of installing electrical conduit between non-adjacent electrical junction boxes is shown and denoted generally by the numeral 10. In FIG. 1, a series of identical, standard electrical junction boxes 12, 14, 16 and 18 all having a uniform depth are shown secured in a conventional manner to studs 20, 22, 24 and 26, respectively. A pair of non-adjacent electrical junction boxes, such as electrical junction boxes 12 and 16, are connected by a rigid conduit 28 which exits the bottom of electrical junction box 12 and enters the bottom of electrical junction box 16. Because the electrical junction boxes 12, 14, 16 and 18 are identical and of the same depth, the conduit 28 is provided with curved sections 30 and 32 which form approximately 90° bends in the conduit to enable the installation of the conduit 28 to avoid interference with the electrical junction box 14. As understood, this method of installation requires curved sections of conduit which must either be purchased or formed prior to installation in order to facilitate connecting two non-adjacent electrical junction boxes. This is an inefficient and costly method of installation.

Figure 2:
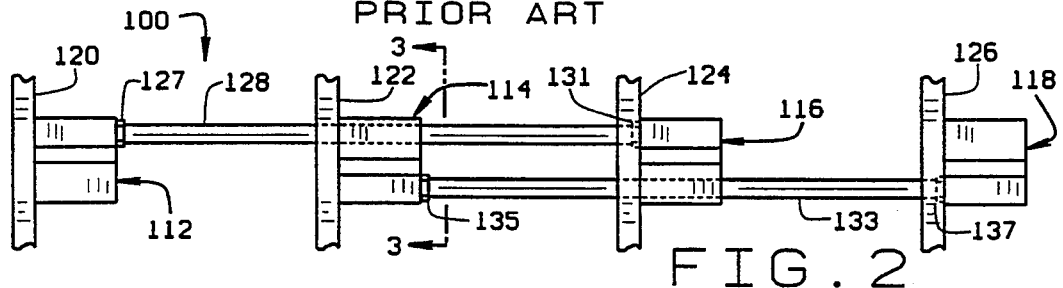
FIG. 2 illustrates electrical conduit installed in accordance with one embodiment of the method of the present invention.
Figure 4:
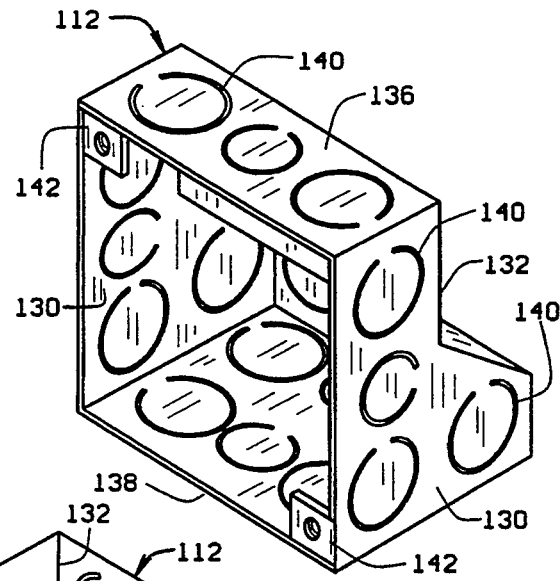
FIG. 4 is a front perspective view of one embodiment of an electrical junction box used in conjunction with the method of installation shown in FIG. 2.
Figure 5:
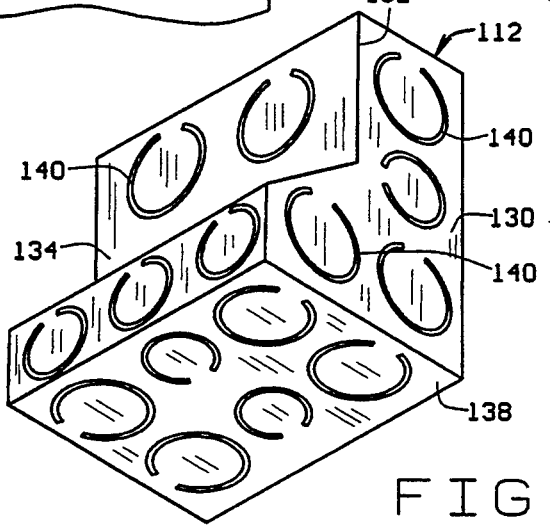
FIG. 5 is a rear perspective view of the electrical junction box in FIG. 4.

Referring now to FIG. 2, a method of the present invention which avoids the problems of the prior art is illustrated and denoted generally by the numeral 100. In FIG. 2, identical electrical junction boxes 112, 114, 116 and 118 are secured in a conventional manner to studs 120, 122, 124 and 126, respectively. In contrast to the prior art method shown in FIG. 1, non-adjacent electrical junction boxes, such as electrical junction boxes 112 and 116, are connected by a straight section of conduit 128 entering and exiting one side of the respective electrical junction boxes. In order to facilitate this method of installation, each of the electrical junction boxes 112, 114, 116 and 118 are of the shape as shown in FIGS. 4 and 5. For brevity and clarity of description, only electrical junction box 112 is shown in FIG. 4 and described, but it should be understood that all of the electrical junction boxes 112, 114, 116 and 118 are identically shaped.

The electrical junction box 112 includes a pair of opposed sidewalls 130 each having a recessed section 132 generally forming two distinct sections of electrical junction box 112, each of a different depth. The section corresponding to the recessed section 132 of sidewall 130 is of a lesser depth than the remainder of the electrical junction box 112. The electrical junction box 112 has a back surface 134, a top surface 136 and a bottom surface 138, which together with sidewalls 130 define an interior volume with an open front. Each of sides 130, back 134, top 136 and bottom 138 include a plurality of removable pryouts or plugs 140 which can be removed to permit the electric wiring to be inserted into the interior cavity of the electrical junction box 112 and to which the conduit can be connected. As shown in FIGS. 4 and 5, at least one removable plug 140 is presented in the sides 130 of the electrical junction box 112 in the section of greater depth to permit the connection of conduit to this section of the box. The electrical junction box 112 is also provided with a pair of mounting tabs 142 at the open end of the box.

Figure 3:
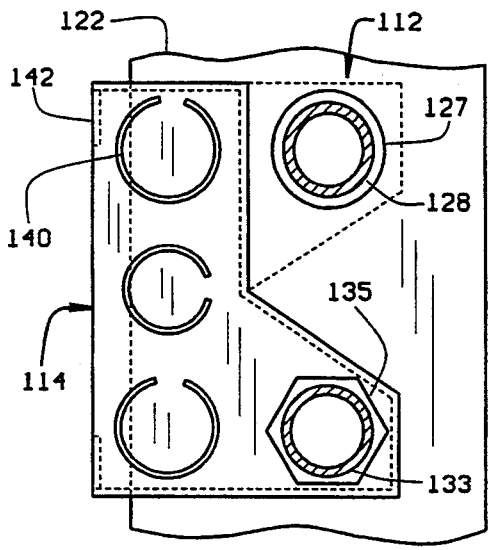
FIG. 3 is a cross sectional view through the line 3—3 of FIG. 2 showing the configuration of electrical junction boxes installed in accordance with the method of the present invention as shown in FIG. 2.

An electrical junction box of the shape and type shown in FIGS. 4 and 5 is used in conjunction with the method of installing electrical conduits as shown FIGS. 2 and 3. To facilitate the installation of straight sections of electrical conduit 128 between non-adjacent electrical junction boxes, such as the electrical junction boxes 112 and 116, when at least one electrical junction box is installed between the two electrical junction boxes to be connected and at the same elevation, such as the electrical junction box 114, the electrical junction box 114 between the electrical junction boxes 112 and 116 is installed in an inverse orientation with respect to the orientation of the installation of the non-adjacent electrical junction boxes 112 and 116. That is, if the section of greater depth of the non-adjacent electrical junction boxes to be connected is positioned at the bottom, the section of greater depth of the intervening box will be installed so as to be at the top of the box. As shown in FIG. 3, the intervening box 114 is rotated 180° to obtain the inverse orientation with respect to the boxes 112 and 116 being connected. This permits the conduit 128 to be installed in straight sections between the sections of greater depth of the electrical junction boxes 112 and 116, by exiting and/or entering through the respective side of electrical junction boxes 112 and 116. The electrical conduit is secured to the electrical junction boxes 112 and 116 by couplings 127 and 131, respectively. Because of the inverse orientation of the electrical junction box 114 between the electrical junction boxes 112 and 116 with respect to the orientation of the pair of electrical junction boxes 112 and 116, the electrical conduit 128 passes behind the section of lesser depth of the electrical junction box 114 and in juxtaposition thereto. Electrical junction boxes 114 and 118 are connected by a conduit 133 in a like manner as illustrated in FIG. 2. The conduit 133 is connected to the electrical junction boxes 114 and 118 by the couplings 135 and 137, respectively. As is understood, a plurality of electrical junction boxes can be positioned between the electrical junction boxes to be connected so long as they are all installed and positioned in an inverse orientation with respect to the boxes to be connected. It will also be appreciated that although illustrated and described with respect to a plurality of boxes installed in horizontal alignment, this method is likewise applicable to a vertical series of electrical junction boxes.

Figure 6:
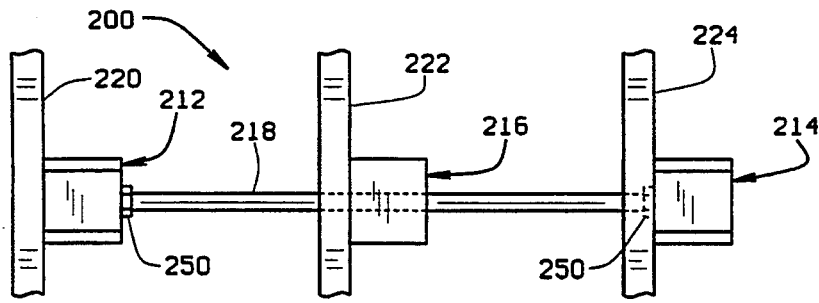
FIG. 6 illustrates electrical conduit installed between electrical junction boxes in accordance with a second embodiment the method of the present invention.

Referring now to FIG. 6, a second method for installing electrical conduit between non-adjacent electrical junction boxes is shown and denoted generally by the numeral 200. A pair of identical non-adjacent electrical junction boxes 212 and 214 are shown in FIG. 6 secured in a conventional manner to studs 220 and 224 respectively. An intervening electrical junction box 216 is positioned between and at the same elevation as the electrical junction boxes 212 and 214. The electrical junction box 216 is secured to a stud 222. As shown in FIG. 6, the electrical conduit 218 exits from one side of the electrical junction box 212 and passes behind the electrical junction box 216 before entering into the side of the electrical junction box 214. To permit the installation of the electrical conduit 218 between a pair of non-adjacent electrical junction boxes 212 and 214 in straight sections as shown in FIG. 6, the electrical junction boxes 212 and 214 are shaped as shown in FIGS. 9 and 10 and the intervening electrical junction box 216 is shaped as shown in FIGS. 7 and 8.

Figures 7, 8:
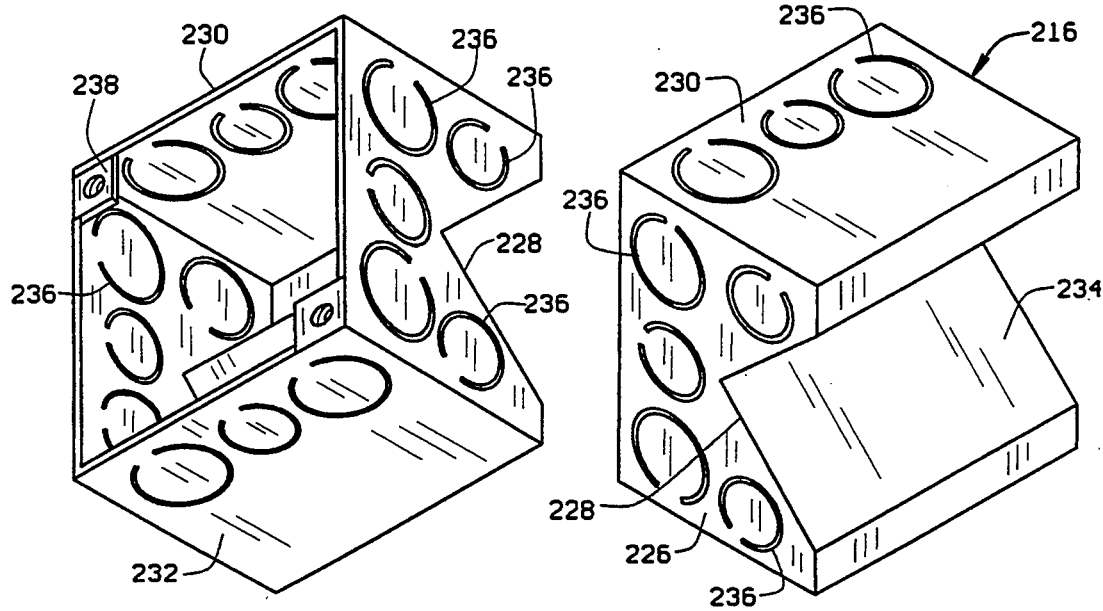
FIG. 7 is a front perspective view of a second embodiment of an electrical junction box used in conjunction with the method of installation shown in FIG. 6.
FIG. 8 is a rear perspective view of the electrical junction box shown in FIG. 7.

In FIGS. 7 and 8, the electrical junction box 216 is shown and includes a pair of sidewalls 226 having a central recessed section 228, a top surface 230, a bottom surface 232, and a back surface 234 defining an interior volume with an open front. A central indentation or groove is presented in the electrical junction box 216 as a result of the recessed section 228 of sidewalls 226 which provides a central section of lesser depth flanked by sections of greater depth. The electrical junction box 216 is provided with numerous removable plugs or pryouts 236 into which the electrical conduit 218 can be connected. A pair of mounting tabs 238 are also provided on the open front of the electrical junction box 216.

Figures 9, 10:
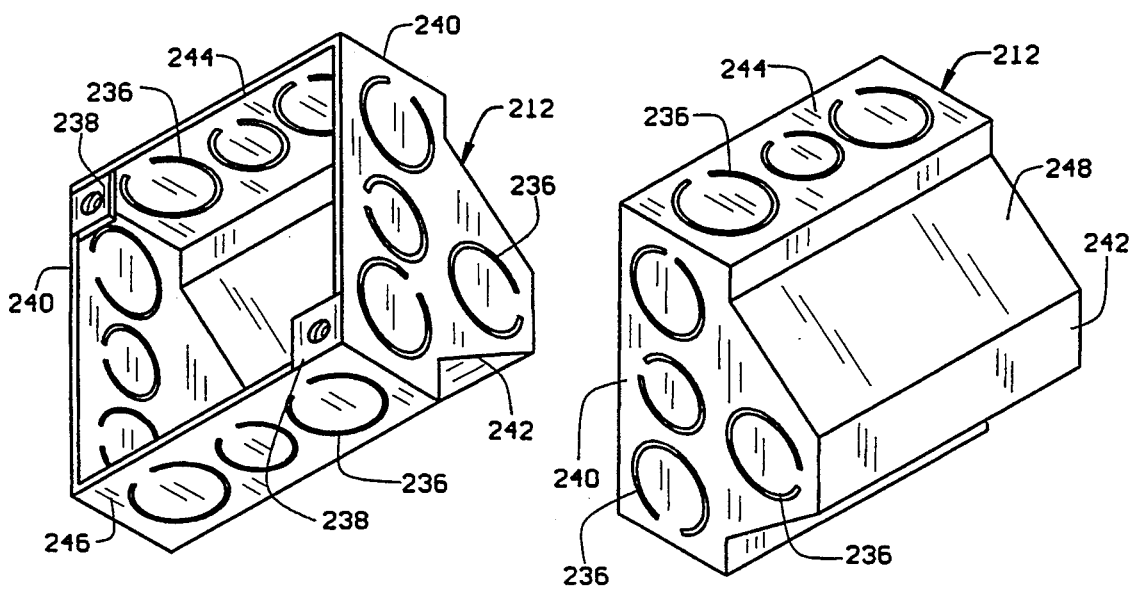
FIG. 9 is a front perspective view of another embodiment of an electrical junction box utilized in the connection with the method of installation shown in FIG. 6.
FIG. 10 a rear perspective view of the electrical junction box shown in FIG. 9.

In FIGS. 9 and 10, the design of the identical non-adjacent electrical junction boxes 212 and 214 is shown with reference only to the electrical junction box 212. The electrical junction box 212 includes a pair of sidewalls 240 each having a central extended section 242, a top surface 244, a bottom surface 246 and a back surface 248 defining an interior volume with an open front. The central extended section 242 forms an electrical junction box 212 having a central section of greater depth flanked by sections of lesser depth. The electrical junction box 212 is also provided with a plurality of removable plugs or pryouts 236 and in particular such a removable plug 236 in the area of greater depth of the box. A pair of mounting tabs 238 are also provided at the open front of the box 212.

As shown in FIG. 6, the use of non-adjacent electrical junction boxes 212 and 214 as the electrical junction boxes to be connected and an electrical junction box 216 positioned between the pair of non-adjacent electrical junction boxes permits the installation of a straight section of electrical conduit 218 between the boxes 212 and 214. The electrical conduit is connected by a coupling 250 to the extended section 242 of electrical junction box 212 and passes behind and in juxtaposition to the recessed section 228 of electrical junction box 216 and then connects to the corresponding extended section 242 of one of the sidewalls 240 of the electrical junction box 214 and is secured thereto by another coupling 250. Alternately, electrical conduit can be installed in straight sections between the sections of greater depth a pair of electrical junction boxes 216 where the electrical conduit passes behind and in juxtaposition to one of the sections of lesser depth of an electrical junction box 212 positioned therebetween.

It is understood that the methods and devices of this invention permit the installation of electrical junction boxes and electrical conduit in a quick and efficient manner by eliminating the need for curved sections of conduit during installation. The various elements of this invention may be constructed of readily available materials and the variously shaped electrical junction boxes of this invention may include other features to facilitate their installation such as plaster rings, box supports, routing brackets and the like. Various sizes of the electrical junction boxes can also be constructed and used in conjunction with the methods of this invention.

While the present invention has been described by reference to specific embodiments, it should be understood that modifications and variations of the invention may be constructed without departing from the scope of the invention as defined in the following claims.

What is claimed is:

1. A method for installing electrical conduit between at least one pair of non-adjacent electrical junction boxes to avoid interference from at least one electrical junction box positioned therebetween, the method comprising:

providing a plurality of electrical junction boxes each comprising at least one first section of a first depth and at least one second section of a second depth, the second depth being greater than the first depth;

installing at least one pair of non-adjacent electrical junction boxes in a first orientation with respect to the first and second sections of the electrical junction boxes and installing at least one electrical junction box between the pair of non-adjacent electrical junction boxes in an inverse orientation with respect to the orientation of the pair of non-adjacent electrical junction boxes; and connecting the pair of non-adjacent electrical junction boxes by installing the electrical conduit between the pair of non-adjacent electrical junction boxes such that the conduit passes behind and in juxtaposition to one of the first sections of the at least one electrical junction box between the pair of non-adjacent electrical junction boxes.

2. The method of claim 1 wherein the inverse orientation of the at least one electrical junction box between the pair of non-adjacent electrical junction boxes is obtained by turning the electrical junction box 180° with respect to the non-adjacent electrical junction boxes.

3. The method of claim 1 wherein the electrical conduit is installed in straight sections between the pair of non-adjacent electrical junction boxes.

4. The method of claim 1 wherein the electrical conduit is rigid.

5. The method of claim 1 wherein the depth of the second section of the plurality of electrical junction boxes is about twice the depth of the first section of the electrical junction boxes.

6. The method of claim 1 wherein the pair of non-adjacent electrical junction boxes are horizontally aligned with the at least one electrical junction box therebetween.

7. A method for installing electrical conduit between at least one pair of non-adjacent electrical junction boxes to avoid interference from at least one electrical junction box positioned therebetween, the method comprising:
providing a plurality of first electrical junction boxes each having top and bottom sections of a first depth and a central section of a second depth, the second depth being less than the first depth;
providing a plurality of second electrical junction boxes each having top and bottom sections of a third depth and a central section of a fourth depth, the fourth depth being greater than the third depth;
selecting and installing at least one pair of either the first electrical junction boxes or the second electrical junction boxes to form the pair of non-adjacent electrical junction boxes and installing at least one of the non-selected electrical junction boxes between the pair of selected electrical junction boxes;
installing the electrical conduit between the pair of non-adjacent electrical junction boxes such that the conduit passes behind and in juxtaposition to one of the sections of lesser depth of the electrical junction box between the pair of non-adjacent electrical junction boxes.

8. The method of claim 7 wherein the first depth is equivalent to the fourth depth and the second depth is equivalent to the third depth.

9. The method of claim 7 wherein the electrical conduit is installed in straight sections between the pair of non-adjacent electrical junction boxes.

10. The method of claim 7 wherein the electrical conduit is rigid.

11. The method of claim 7 wherein the pair of non-adjacent electrical junction boxes are horizontally aligned with the at least one electrical junction box therebetween.

12. An installation system for electrical conduit between at least one pair of non-adjacent electrical junction boxes having at least one electrical junction box in horizontal alignment with and positioned between the pair of electrical junction boxes, the system comprising:
at least one pair of first electrical junction boxes, each comprising at least one first section of a first depth and at least one second section of a second depth, the second depth being greater than the first depth;
an electrical conduit having first and second ends, one end connected to one of the pair of first electrical junction boxes and the other end connected to the other of the pair of first electrical junction boxes where the electrical conduit is connected to the electrical junction boxes through the second sections of the pair of electrical junction boxes; and
at least one second electrical junction box to be positioned between the pair of first electrical junction boxes, the second electrical junction box configured in a manner to permit passage of the electrical conduit behind the second electrical junction box.

13. The installation system as set forth in claim 12 wherein the second electrical junction box is shaped identical to the pair of first electrical junction boxes.

14. The installation system as set forth in claim 13 wherein the second electrical junction box is capable of being installed in an orientation inverse to the installation of the pair of first electrical junction boxes to facilitate the passage of the electrical conduit therebehind and in juxtaposition thereto.

15. The installation system as set forth in claim 12 wherein the second electrical junction box comprises at least one section of lesser depth, said lesser depth a section being oriented in a location complementary to the second section of the first electrical junction boxes.

16. The installation system as set forth in claim 15 wherein the electrical conduit passes adjacent to the section of lesser depth of the second electrical junction box.

17. The installation system as set forth in claim 12 wherein the electrical conduit is provided in linear sections.

18. The installation system as set forth in claim 12 wherein the pair of first electrical junction boxes each includes a central section of a second depth flanked by sections of a first depth and the second electrical junction box includes a central section of a third depth flanked by sections of a fourth depth, the fourth depth being greater than the third depth.

19. The installation system as set forth in claim 18 wherein the first depth is equivalent to the third depth and the second depth is equivalent to the fourth depth.

* * * * *